(12) United States Patent
Li et al.

(10) Patent No.: US 12,472,549 B2
(45) Date of Patent: Nov. 18, 2025

(54) STAMPING METHOD AND DEEP-DRAWING DIE FOR ALUMINUM ALLOY LINER OF LARGE-VOLUME HYDROGEN STORAGE CYLINDER

(71) Applicant: Sinoma Science & Technology (Chengdu) Co., Ltd., Chengdu (CN)

(72) Inventors: Shihong Li, Chengdu (CN); Cunjiang Feng, Chengdu (CN); Hao Yi, Chengdu (CN); Qingbo Gong, Chengdu (CN); Qinling He, Chengdu (CN); Jiachao He, Chengdu (CN); Yong Tang, Chengdu (CN); Na Qi, Chengdu (CN)

(73) Assignee: Sinoma Science & Technology (Chengdu) Co., Ltd., Chengdu (CN)

( * ) Notice: Subject to any disclaimer, the term of this patent is extended or adjusted under 35 U.S.C. 154(b) by 279 days.

(21) Appl. No.: 18/303,136

(22) Filed: Apr. 19, 2023

(65) Prior Publication Data

US 2024/0051006 A1 Feb. 15, 2024

(30) Foreign Application Priority Data

Aug. 15, 2022 (CN) .......................... 202210972644.1

(51) Int. Cl.
*B21D 22/28* (2006.01)
*B21D 51/16* (2006.01)

(52) U.S. Cl.
CPC ............. *B21D 22/28* (2013.01); *B21D 51/16* (2013.01)

(58) Field of Classification Search
CPC ...... B21D 22/28; B21D 22/30; B21D 22/201; B21D 51/24
See application file for complete search history.

(56) References Cited

U.S. PATENT DOCUMENTS

| 3,943,867 A | * | 3/1976 | Erfurt | ................... B21D 51/24 29/463 |
| 4,441,354 A | * | 4/1984 | Bodega | ................... B21D 51/24 72/364 |

* cited by examiner

*Primary Examiner* — Debra M Sullivan
(74) *Attorney, Agent, or Firm* — Cooper Legal Group, LLC

(57) ABSTRACT

Disclosed are a stamping method and a deep-drawing die for an aluminum alloy liner of a large-volume hydrogen storage cylinder, which solve that technical problem of low production efficiency of processing the aluminum alloy liner of the large-volume hydrogen storage cylinder by adopting strong spin and thinning of an aluminum tube in the prior art. The stamping method includes heating and stamping an aluminum ingot into a cup-shaped rough blank, then cold deep drawing the cup-shaped rough blank for thinning and lengthening into an aluminium alloy liner, and the deep-drawing die includes terrace die and thinning dies.

8 Claims, 2 Drawing Sheets

STAMPING METHOD AND DEEP-DRAWING DIE FOR ALUMINUM ALLOY LINER OF LARGE-VOLUME HYDROGEN STORAGE CYLINDER

CROSS-REFERENCE TO RELATED APPLICATIONS

This application claims priority to Chinese Patent Application No. 202210972644.1, filed on Aug. 15, 2022, the contents of which are hereby incorporated by reference.

TECHNICAL FIELD

The present application belongs to the technical field of pressure vessel processing, and particularly relates to a stamping method and a deep-drawing die for an aluminum alloy liner of a large-volume hydrogen storage cylinder.

BACKGROUND

Unlike coal, oil and natural gas that are extracted directly, hydrogen is a secondary energy source derived from other energy sources by certain methods.

It is an acknowledged source of clean energy standing out as a low and zero carbon energy source. Currently, indispensable energy sources for human survival, such as oil, natural gas, coal and liquefied petroleum gas (LPG), are non-renewable resources in limited supply on the earth, and new energy resources that do not depend on fossil fuels and are rich in reserves are in urgent need since the non-renewable resources will one day be depleted with the increasing consumption of fossil fuels and their decreasing reserves. Hydrogen is a secondary energy source of this kind. It is the first element in the periodic table of the elements with an atomic number of 1; it is gaseous under room temperature and pressure, and liquid at ultra-low temperature and high pressure. As an ideal new energy-containing source, it has the following characteristics:

lightest weight: at −252.5 degrees Celsius (° C.), hydrogen of standard state is liquid with a density of 0.0899 gram per liter (g/L), and changes to metallic hydrogen if the pressure is increased to several hundred atmospheres (atm);

best thermal conductivity: the thermal conductivity of hydrogen is 10 times higher than that of most gases;

abundant reserves: hydrogen, estimated to constitute 55% of the mass of the universe, is stored mainly in the form of compounds in water, the most widespread substance on the earth; it is presumed that if all the hydrogen in seawater is extracted, the total heat it generates is 9,000 times greater than the heat released by all the fossil fuels on earth;

good for recycling: water is the only waste discharged from cars using hydrogen energy, which can be decomposed and used again;

ideal calorific value: hydrogen has the highest calorific value among all the fossil fuels, chemical and biofuels except nuclear fuels, at 142,351 kilojoules per kilogram (kJ/kg), which is three times the calorific value of gasoline;

good combustion performance: it is easy to ignite with a wide range of combustion limit when mixed with air, as well as a high ignition point and rapid combustion speed;

environmental friendliness: compared to other fuels, hydrogen is the cleanest energy for burning, producing no environmentally harmful pollutants such as carbon monoxide, carbon dioxide, hydrocarbons, lead compounds and dust particles, apart from water and small amounts of hydrogen nitride, and small amounts of ammonia which, when properly treated, do not pollute the environment;

various forms of utilization: it can be used to generate heat through combustion, to produce mechanical work in heat engines, or as an energy material in fuel cells or converted into solid hydrogen for use as a structural material;

various forms: it is found in gaseous, liquid or solid metal hydrides and can be adapted to the different requirements of storage, transportation and various applications;

less loss of energy: it is possible to replace long-distance high-voltage transmission with long- and near-distance pipeline transmission of hydrogen, with relatively higher safety and less inefficient loss of energy;

high utilization rate: the noise generated by the internal combustion engine and the risk of energy pollution are eliminated by using hydrogen, and the utilization rate is high; and ease of transport: hydrogen is light in weight and allows for a higher payload on the vehicle, thereby reducing transport costs and providing better overall social benefits than other energy sources.

Hydrogen is increasingly used in the automotive industry as a clean and environmental friendly renewable energy source with ample sources, and the aluminium lined carbon fiber fully wound cylinder served as a hydrogen carrying tool is required to be of high pressure resistance, good airtightness and lightweight.

The aluminium alloy liner of large volume hydrogen storage cylinder is generally thinned by strong spinning of aluminium tubes, a method that takes a long time and offers low production efficiency.

Accordingly, a stamping method and corresponding deep-drawing die for the aluminium alloy liner of large volume hydrogen storage cylinder become urgent technical problems to be solved by those skilled in the art so as to improve the efficiency of processing and preparing the aluminium alloy liner of large volume hydrogen storage cylinder.

SUMMARY

The technical problems to be solved by the present application is to provide a stamping method and a deep-drawing die for aluminum alloy liners of large-volume hydrogen storage cylinders, and in particular to a stamping method and a deep-drawing die for an aluminum alloy liner of a fully-wound hydrogen storage cylinder, including heat stamping aluminium ingots, turning by a lathe, and finally cold deep drawing and forming. The method allows for the production of aluminium alloy liners for hydrogen storage cylinders with no strong spin thinning, thus effectively solving the technical problem of low production efficiency of preparing large volume aluminium alloy liners for hydrogen storage cylinders using strong spin-thinning of aluminium tubes in the prior art.

In order to achieve the above objectives, the technical schemes adopted by the present application are as follows:

a method for stamping aluminum alloy liners of large-volume hydrogen storage cylinders, including: heating and stamping an aluminum ingot into a cup-shaped rough blank, then cold deep drawing the cup-shaped rough blank for thinning and lengthening into an aluminium alloy liner.

Optionally, the cup-shaped rough blank is arranged with a barrel and a bottom of uniform wall thickness, and the barrel and the bottom of the cup-shaped rough blank are arranged in transition of a rounded corner R.

Optionally, the aluminium ingot is heated to 520-570 degrees Celsius (° C.) before being stamped into a cup-shaped rough blank.

Optionally, the cup-shaped rough blank is turned on a lathe to an accurately designed size and its surface defects are eliminated, then the cup-shaped rough blank is annealed to remove machining stresses and soften its texture before cold deep drawing the cup-shaped rough blank.

Optionally, as cold deep drawing the cup-shaped rough blank for thinning and lengthening into an aluminium alloy liner, the cold deep drawing is carried out in one or more passes, and mineral oil is used for lubrication during the cold deep drawing.

Optionally, the method for stamping aluminum alloy liners of large-volume hydrogen storage cylinders includes the following steps:

step 1, heating a certain amount of aluminum ingots to 530-570° C., and keeping the temperature for 40-60 seconds (s);

step 2, quickly transferring the aluminum ingots into a stamping outer die, with transferring duration being controlled within 10 s;

step 3, fixing the stamping outer die, preparing a cup-shaped rough blank by stamping an inner membrane, and cooling;

step 4, processing an R corner between the barrel and the bottom of the cup-shaped rough blank by a lathe after the cup-shaped rough blank is cooled while controlling an outer diameter and eliminating defects on an outer surface;

step 5, machining an inner hole of the cup-shaped rough blank by lathe or deep boring, eliminating defects and reaching a designed inner diameter to form a designed wall thickness;

step 6, carrying out high-temperature annealing on the cup-shaped rough blank at 350-370° C. to remove processing stress and soften the texture;

step 7, coating mineral oil inside and outside the cup-shaped rough blank;

step 8, placing the cup-shaped rough blank on a center of a thinning die; and step 9, fixing the thinning die, driving a terrace die to press the cup-shaped rough blank into the thinning die at a speed of 30-70 millimeters per second (mm/s) for thinning and deep drawing so as to obtain an aluminium alloy liner.

Optionally, the thinning and deep drawing in step 9 is carried out in one pass or multiple passes, and a thinning rate $\psi$ during the thinning and deep drawing is calculated according to a formula as follows: thinning rate $\psi$=wall thickness after thinning $t_n$/wall thickness before thinning $t_{n-1}$.

Optionally, in a case where a total amount of thinning of the cup-shaped rough blank is small and only one pass of thinning and deep drawing is required, the thinning rate of one pass is controlled between 0.5 and 0.6.

Optionally, in cases where a total thinning of the cup-shaped rough blank is large and multiple passes of thinning and deep drawing are required, a thinning rate of a first pass thinning is controlled between 0.5 and 0.6, a thinning rate of an intermediate pass thinning is controlled between 0.63 and 0.72, and a thinning rate of a final pass thinning is controlled above 0.75.

A deep-drawing die for the method for stamping aluminum alloy liners of large-volume hydrogen storage cylinders, where the deep-drawing die for cold deep drawing a cup-shaped rough blank for thinning and lengthening into an aluminium alloy liner includes a terrace die, and at least one thinning die matched with the terrace die for cold deep drawing the cup-shaped rough blank into an aluminum alloy liner; a gap between the terrace die and the thinning die is less than a wall thickness of the cup-shaped rough blank when the terrace die is inserted into the thinning die, and when two or more thinning dies are arranged, the thinning dies are fixed together by means of long bolts.

Compared with the prior art, the present application achieves the following beneficial effects:

the present application is scientifically and reasonably designed with easy operation; it is a method for manufacturing aluminum alloy liners of hydrogen storage cylinders without strong spinning and thinning, including steps of heat stamping of aluminum ingots, lathe turning, cold deep drawing and finally forming; it offers relatively high processing efficiency, good product surface smoothness and mirror surface effect as comparing to strong spinning and thinning process; by applying the present method, the technical problems, including low production efficiency of using aluminium tubes for strong spin thinning to prepare aluminium alloy liner of large volume hydrogen storage cylinders, are effectively solved; and in the present application, aluminum ingot is mainly heat stamped into cup-shaped rough blank, and then the size of the cup-shaped rough blank is accurately controlled by turning, and surface defects are removed at the same time; after turning, annealing treatment is carried out to eliminate stress, and finally the wall thickness is reduced by one or more cold deep drawing to reach the designed size of aluminum alloy liner; the entire shaping and deforming process is carried out by stamping, which requires no strong spinning and thinning, thus greatly improving the efficiency of processing the aluminium alloy liner of the hydrogen storage cylinder.

DETAILED DESCRIPTION OF THE EMBODIMENTS

In order to make the objectives, technical schemes and advantages of the present application more clearly understood, the present application is described in further detail below in conjunction with the accompanying drawings. It is clear that the described embodiments are only a part of the embodiments of the present application, and not all of them. Based on the embodiments in the present application, all other embodiments obtained without creative labour by a person of ordinary skill in the art shall fall within the protection scope of the present application.

Embodiment 1

Figure 1:
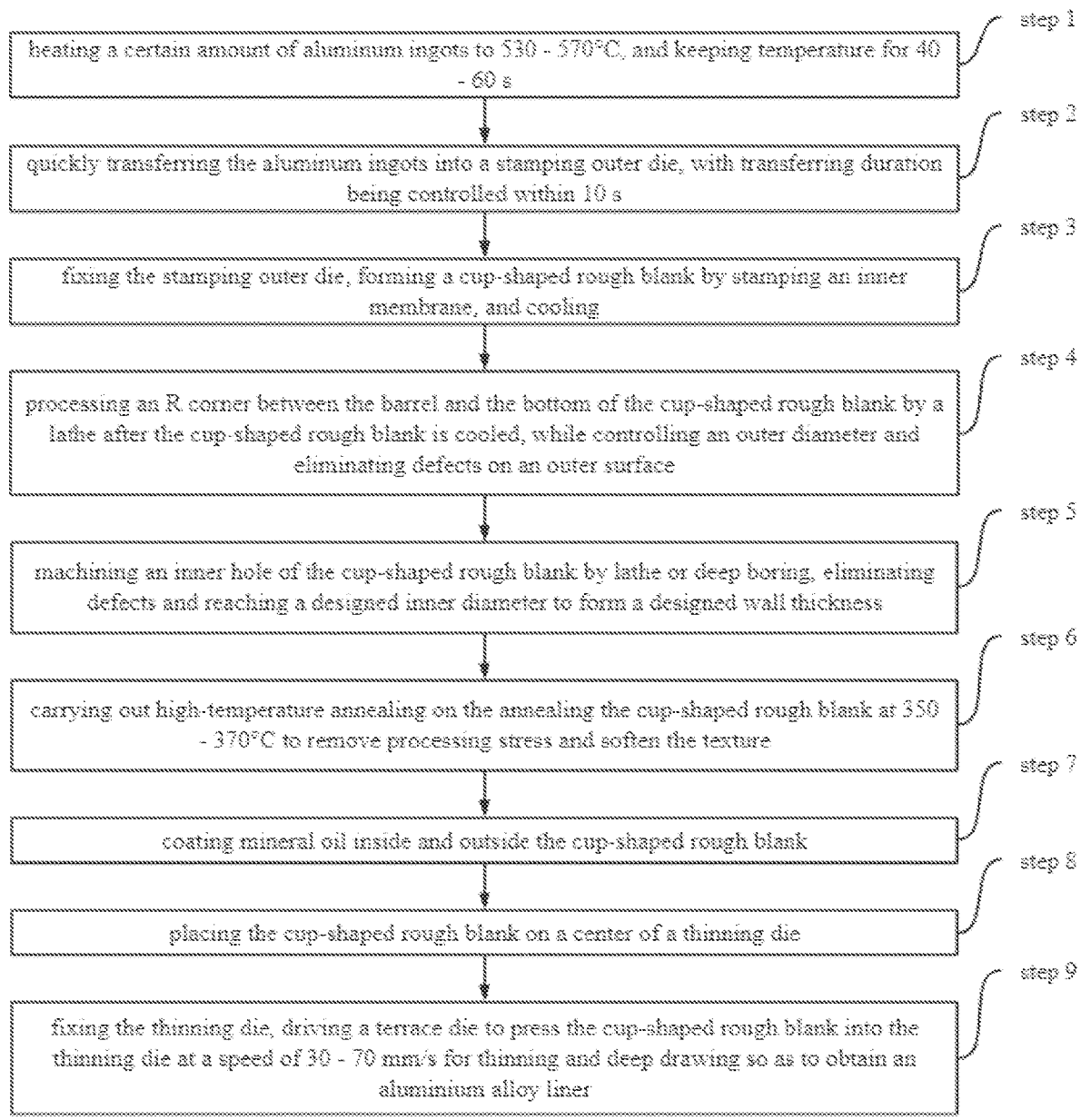
FIG. 1 is a process that illustrates a method for stamping aluminum alloy liners of large-volume hydrogen storage cylinders provided by the present application.
Figure 2:
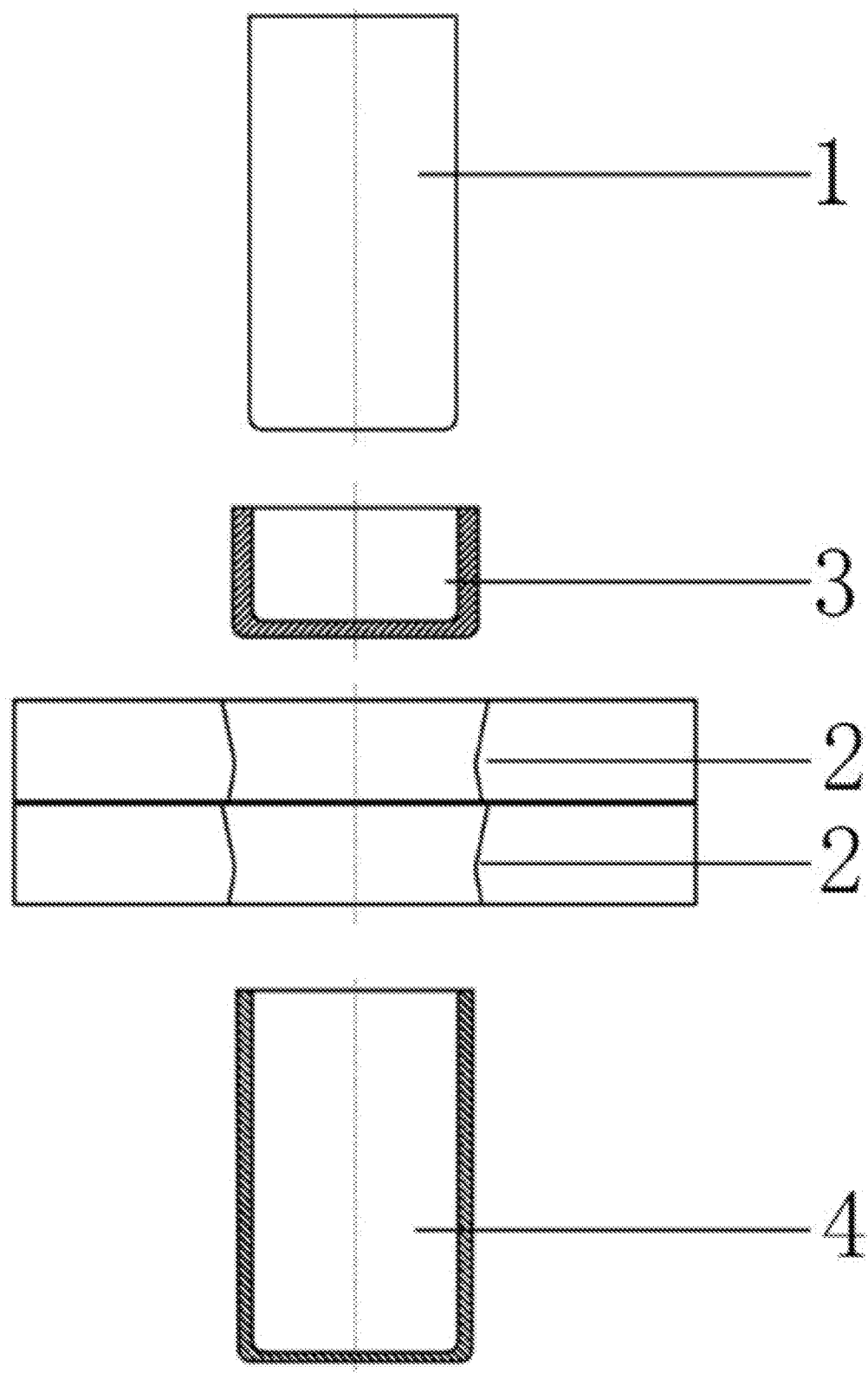
FIG. 2 is a schematic structural diagram of a deep-drawing die of the present application.

Referring to FIG. 1 and FIG. 2, the present application provides a method for stamping aluminum alloy liners of large-volume hydrogen storage cylinders, including: heating and stamping an aluminum ingot into a cup-shaped rough blank, then cold deep drawing the cup-shaped rough blank for thinning and lengthening into an aluminium alloy liner.

The present application is scientifically and reasonably designed with easy operation; it is a method for producing aluminum alloy liners of hydrogen storage cylinders without strong spinning and thinning, including steps of heat stamping of aluminum ingots, lathe turning, cold deep drawing and finally forming; it offers relatively high processing efficiency, good product surface smoothness and mirror surface effect as comparing to strong spinning and thinning process; by applying the method, the technical problems, including low production efficiency of using aluminium tubes for strong spin thinning to prepare aluminium alloy liner of large volume hydrogen storage cylinders, are effectively solved.

Embodiment 2

Referring to FIG. 1 and FIG. 2, the present application provides a method for stamping aluminum alloy liners of large-volume hydrogen storage cylinders, including: heating and stamping an aluminum ingot into a cup-shaped rough blank, then cold deep drawing the cup-shaped rough blank for thinning and lengthening into an aluminium alloy liner, where the cup-shaped rough blank is arranged with a barrel and a bottom of uniform wall thickness, and the barrel and the bottom of the cup-shaped rough blank are arranged in transition of a rounded corner R.

On the basis of Embodiment 1, the optimal processing requirements for the cup-shaped rough blank are provided in the present Embodiment 2, including: the cup-shaped rough blank is arranged with a barrel and a bottom of uniform wall thickness, and the barrel and the bottom of the cup-shaped rough blank are arranged in transition of a rounded corner R. Such design makes it easier for cold deep drawing the cup-shaped rough blank to be thinned and lengthened into the aluminium liner at a later stage, and also ensures that the precision of cold deep drawing the cup-shaped rough blank to be thinned and lengthened into the aluminium alloy liner meets the requirements of aluminium liner processing.

Embodiment 3

Referring to FIG. 1 and FIG. 2, the present application provides a method for stamping aluminum alloy liners of large-volume hydrogen storage cylinders, including: heating and stamping an aluminum ingot into a cup-shaped rough blank, then cold deep drawing the cup-shaped rough blank for thinning and lengthening into an aluminium alloy liner, where the aluminium ingot is heated to 520-550 degrees Celsius (° C.) before being stamped into a cup-shaped rough blank.

Based on Embodiment 1, this Embodiment 3 specifies more preferred processing requirements for stamping aluminium ingots into cup-shaped rough blank, specifically: the aluminium ingot is heated to 520-550° C. before being stamped into a cup-shaped rough blank; by doing so, an optimal cup-shaped rough blank are stamped using the aluminium ingot.

Embodiment 4

As shown in FIG. 1 and FIG. 2, the present application provides a method for stamping aluminum alloy liners of large-volume hydrogen storage cylinders, including: heating and stamping an aluminum ingot into a cup-shaped rough blank, then cold deep drawing the cup-shaped rough blank for thinning and lengthening into an aluminium alloy liner, where the cup-shaped rough blank is turned on a lathe to an accurately designed size and its surface defects are eliminated, then annealed to remove machining stresses and soften its texture before cold deep drawing the cup-shaped rough blank.

A preferred pretreatment requirement for cold deep drawing of the cup-shaped rough blank is illustrated in the present Embodiment 4 on a basis of Embodiment 1, including: turning the cup-shaped rough blank on a lathe to an accurately designed size and eliminating its surface defects, then annealing to remove machining stresses and soften its texture before cold deep drawing the cup-shaped rough blank; in this way, a more efficient cold deep drawing of the cup-shaped blank into a qualified aluminium alloy liner is guaranteed.

Embodiment 5

As shown in FIG. 1 and FIG. 2, the present application provides a method for stamping aluminum alloy liners of large-volume hydrogen storage cylinders, including: heating and stamping an aluminum ingot into a cup-shaped rough blank, then cold deep drawing the cup-shaped rough blank for thinning and lengthening into an aluminium alloy liner, where the cold deep drawing is carried out in one or more passes as cold deep drawing the cup-shaped rough blank for thinning and lengthening into an aluminium alloy liner, and mineral oil is used for lubrication during the cold deep drawing.

The present Embodiment 5 provides preferred processing requirements for cold deep drawing of the cup-shaped rough blank on the basis of Embodiment 1, including: the cold deep drawing is carried out in one or more passes as cold deep drawing the cup-shaped rough blank for thinning and lengthening into an aluminium alloy liner, and mineral oil is used for lubrication during the cold deep drawing. This arrangement ensures a more efficient cold deep drawing of the cup-shaped blank into a qualified aluminium alloy liner.

Embodiment 6

According to FIG. 1 and FIG. 2, the present application provides a method for stamping aluminum alloy liners of large-volume hydrogen storage cylinders, including: heating and stamping an aluminum ingot into a cup-shaped rough blank, then cold deep drawing the cup-shaped rough blank for thinning and lengthening into an aluminium alloy liner, where the method for stamping aluminum alloy liners of large-volume hydrogen storage cylinders includes the following steps:

step 1, heating a certain amount of aluminum ingots to 530-550° C., and keeping temperature for 40-60 seconds (s);

step 2, quickly transferring the aluminum ingots into a stamping outer die, with transferring duration being controlled within 10 s;

step 3, fixing the stamping outer die, forming a cup-shaped rough blank by stamping an inner membrane, and cooling;

step 4, processing an R corner between the barrel and the bottom of the cup-shaped rough blank by a lathe after the cup-shaped rough blank is cooled while controlling an outer diameter and eliminating defects on an outer surface;

step 5, machining an inner hole of the cup-shaped rough blank by lathe or deep boring, eliminating defects and reaching a designed inner diameter to form a designed wall thickness;

step 6, carrying out high-temperature annealing on the cup-shaped rough blank at 350-370° C. to remove processing stress and soften the texture;

step 7, coating mineral oil inside and outside the cup-shaped rough blank;

step 8, placing the cup-shaped rough blank on a center of a thinning die; and step 9, fixing the thinning die, driving a terrace die to press the cup-shaped rough blank into the thinning die at a speed of 30-50 millimeters per second (mm/s) for thinning and deep drawing into an aluminium alloy liner.

The present Embodiment 6 provides, on the basis of Embodiment 1, specific steps for implementing the method for stamping aluminum alloy liners of large-volume hydrogen storage cylinders, including:

step 1, heating a certain amount of aluminum ingots to 530-550° C., and keeping temperature for 40-60 s;

step 2, quickly transferring the aluminum ingots into a stamping outer die, with transferring duration being controlled within 10 s;

step 3, fixing the stamping outer die, forming a cup-shaped rough blank by stamping an inner membrane, and cooling;

step 4, processing an R corner between the barrel and the bottom of the cup-shaped rough blank by a lathe after the cup-shaped rough blank is cooled while controlling an outer diameter and eliminating defects on an outer surface;

step 5, machining an inner hole of the cup-shaped rough blank by lathe or deep boring, eliminating defects and reaching a designed inner diameter to form a designed wall thickness;

step 6, carrying out high-temperature annealing on the cup-shaped rough blank at 350-370° C. to remove processing stress and soften the texture;

step 7, coating mineral oil inside and outside the cup-shaped rough blank;

step 8, placing the cup-shaped rough blank on a center of a thinning die; and step 9, fixing the thinning die, driving a terrace die to press the cup-shaped rough blank into the thinning die at a speed of 30-50 mm/s for thinning and deep drawing so as to obtain an aluminium alloy liner. In accordance with the above-mentioned procedure, a large volume aluminium alloy liner for hydrogen storage cylinders with a mirror-like surface finish is produced quickly and efficiently without the operation of strong spin thinning, which greatly improves the efficiency of processing aluminium alloy liner for hydrogen storage cylinders.

Embodiment 7

According to FIG. 1 and FIG. 2, the present application provides a method for stamping aluminum alloy liners of large-volume hydrogen storage cylinders, including: heating and stamping an aluminum ingot into a cup-shaped rough blank, then cold deep drawing the cup-shaped rough blank for thinning and lengthening into an aluminium alloy liner, where the method for stamping aluminum alloy liners of large-volume hydrogen storage cylinders includes the following steps:

step 1, heating a certain amount of aluminum ingots to 530-550° C., and keeping temperature for 40-60 s;

step 2, quickly transferring the aluminum ingots into a stamping outer die, with transferring duration being controlled within 10 s;

step 3, fixing the stamping outer die, forming a cup-shaped rough blank by stamping an inner membrane, and cooling;

step 4, processing an R corner between the barrel and the bottom of the cup-shaped rough blank by a lathe after the cup-shaped rough blank is cooled while controlling an outer diameter and eliminating defects on an outer surface;

step 5, machining an inner hole of the cup-shaped rough blank by lathe or deep boring, eliminating defects and reaching a designed inner diameter to form a designed wall thickness;

step 6, carrying out high-temperature annealing on the cup-shaped rough blank at 350-370° C. to remove processing stress and soften the texture;

step 7, coating mineral oil inside and outside the cup-shaped rough blank;

step 8, placing the cup-shaped rough blank on a center of a thinning die; and step 9, fixing the thinning die, driving a terrace die to press the cup-shaped rough blank into the thinning die at a speed of 30-50 mm/s for thinning and deep drawing into an aluminium alloy liner.

Among them, the thinning and deep drawing in step 9 is carried out in one pass or multiple passes, and a thinning rate $\psi$ during the thinning and deep drawing is calculated according to a formula as follows: thinning rate $\psi$=wall thickness after thinning $t_n$/wall thickness before thinning $t_{n-1}$.

On the basis of Embodiment 6, Embodiment 7 illustrates a more preferred operation method for thinning and deep drawing, specifically: the thinning and deep drawing in the step 9 is carried out in one pass or multiple passes, and the thinning rate $\psi$ during the thinning and deep drawing is calculated according to the formula of thinning rate $\psi$=wall thickness after thinning $t_n$/wall thickness before thinning $t_{n-1}$. Following the above-mentioned procedure, a large volume aluminium alloy liner for hydrogen storage cylinders with a mirror-like surface finish is produced quickly and efficiently without the operation of strong spin thinning, largely improving the efficiency of processing aluminium alloy liner for hydrogen storage cylinders.

Embodiment 8

According to FIG. 1 and FIG. 2, the present application provides a method for stamping aluminum alloy liners of large-volume hydrogen storage cylinders, including: heating and stamping an aluminum ingot into a cup-shaped rough blank, then cold deep drawing the cup-shaped rough blank for thinning and lengthening into an aluminium alloy liner, where the method for stamping aluminum alloy liners of large-volume hydrogen storage cylinders includes the following steps:

step 1, heating a certain amount of aluminum ingots to 530-550° C., and keeping temperature for 40-60 s;

step 2, quickly transferring the aluminum ingots into a stamping outer die, with transferring duration being controlled within 10 s;

step 3, fixing the stamping outer die, forming a cup-shaped rough blank by stamping an inner membrane, and cooling;

step 4, processing an R corner between the barrel and the bottom of the cup-shaped rough blank by a lathe after the cup-shaped rough blank is cooled, while controlling an outer diameter and eliminating defects on an outer surface;

step 5, machining an inner hole of the cup-shaped rough blank by lathe or deep boring, eliminating defects and reaching a designed inner diameter to form a designed wall thickness;

step 6, carrying out high-temperature annealing on the cup-shaped rough blank at 350-370° C. to remove processing stress and soften the texture;

step 7, coating mineral oil inside and outside the cup-shaped rough blank;

step 8, placing the cup-shaped rough blank on a center of a thinning die; and step 9, fixing the thinning die, driving a terrace die to press the cup-shaped rough blank into the thinning die at a speed of 30-50 mm/s for thinning and deep drawing so as to obtain an aluminium alloy liner.

Among them, the thinning and deep drawing in step 9 is carried out in one pass or multiple passes, and a thinning rate $\psi$ during the thinning and deep drawing is calculated according to a formula as follows: thinning rate $\psi$=wall thickness after thinning $t_n$/wall thickness before thinning $t_{n-1}$. In a case where a total amount of thinning of the cup-shaped rough blank is small and only one pass of thinning and deep drawing is required, the thinning rate of one pass is controlled between 0.5 and 0.6.

Based on Embodiment 7, this Embodiment 8 describes a more preferred operation method for the thinning and deep drawing process, specifically: in a case where a total amount of thinning of the cup-shaped rough blank is small and only one pass of thinning and deep drawing is required, the thinning rate of one pass is controlled between 0.5 and 0.6. Following the above-mentioned procedure, a large volume aluminium alloy liner for hydrogen storage cylinders with a mirror-like surface finish is produced quickly and efficiently without the operation of strong spin thinning, largely improving the efficiency of processing aluminium alloy liner for hydrogen storage cylinders.

Embodiment 9

According to FIG. 1 and FIG. 2, the present application provides a method for stamping aluminum alloy liners of large-volume hydrogen storage cylinders, including: heating and stamping an aluminum ingot into a cup-shaped rough blank, then cold deep drawing the cup-shaped rough blank for thinning and lengthening into an aluminium alloy liner, where the method for stamping aluminum alloy liners of large-volume hydrogen storage cylinders includes the following steps:

step 1, heating a certain amount of aluminum ingots to 530-550° C., and keeping temperature for 40-60 s;

step 2, quickly transferring the aluminum ingots into a stamping outer die, with transferring duration being controlled within 10 s;

step 3, fixing the stamping outer die, forming a cup-shaped rough blank by stamping an inner membrane, and cooling;

step 4, processing an R corner between the barrel and the bottom of the cup-shaped rough blank by a lathe after the cup-shaped rough blank is cooled, while controlling an outer diameter and eliminating defects on an outer surface;

step 5, machining an inner hole of the cup-shaped rough blank by lathe or deep boring, eliminating defects and reaching a designed inner diameter to form a designed wall thickness;

step 6, carrying out high-temperature annealing on the cup-shaped rough blank at 350-370° C. to remove processing stress and soften the texture;

step 7, coating mineral oil inside and outside the cup-shaped rough blank;

step 8, placing the cup-shaped rough blank on a center of a thinning die; and step 9, fixing the thinning die, driving a terrace die to press the cup-shaped rough blank into the thinning die at a speed of 30-50 mm/s for thinning and deep drawing so as to obtain an aluminium alloy liner.

Among them, the thinning and deep drawing in step 9 is carried out in one pass or multiple passes, and a thinning rate $\psi$ during the thinning and deep drawing is calculated according to a formula as follows: thinning rate $\psi$=wall thickness after thinning $t_n$/wall thickness before thinning $t_{n-1}$. In cases where the total thinning of the cup-shaped rough blank is large and multiple passes of thinning and deep drawing are required, the thinning rate of a first pass is controlled between 0.5 and 0.6, that of an intermediate pass is controlled between 0.63 and 0.52, and that of a final pass is controlled above 0.55.

An optimized processing method is provided in the present Embodiment 9 on a basis of Embodiment 7, including: in a case where a total amount of thinning of the cup-shaped rough blank is small and only one pass of thinning and deep drawing is required, the thinning rate of one pass is controlled between 0.5 and 0.6. According to the above-mentioned procedure, a large volume aluminium alloy liner for hydrogen storage cylinders with a mirror-like surface finish is produced quickly and efficiently without the operation of strong spin thinning, largely improving the efficiency of processing aluminium alloy liner for hydrogen storage cylinders.

In the present application, aluminum ingot is mainly hot-stamped into cup-shaped rough blank, and then the size of the cup-shaped rough blank is accurately controlled by turning, and surface defects are removed at the same time; after turning, annealing treatment is carried out to eliminate stress, and finally the wall thickness is reduced by one or more cold deep drawing to reach the designed size of aluminum alloy liner; the entire plastic deformation process is carried out by stamping, which removes the requirement for strong spinning and thinning, thus greatly improving the efficiency of processing the aluminium alloy liner of the hydrogen storage cylinder.

Embodiment 10

According to FIG. 1 and FIG. 2, the present application provides a deep-drawing die for the method for stamping aluminum alloy liners of large-volume hydrogen storage cylinders, where the deep-drawing die for cold deep drawing a cup-shaped rough blank for thinning and lengthening into an aluminium alloy liner includes a terrace die 1, and at least one thinning die 2 matched with the terrace die 1 for cold deep drawing the cup-shaped rough blank into an aluminum alloy liner; a gap between the terrace die 1 and the thinning die 2 is less than a wall thickness of the cup-shaped rough blank, and when there are two or more thinning dies 2, the thinning dies 2 are fixed together by means of long bolts. The arrangement allows for the efficient and fast cold deep drawing of the cup-shaped rough blank for thinning and lengthening into a mirror finish aluminium alloy liner, greatly improving the efficiency of processing aluminium alloy liner for hydrogen storage cylinders. As shown in FIG. 2, the terrace die 1 presses the cup-shaped rough blank 3, which has been turned and annealed to relieve stress and soften the texture, into the thinning die 2 for thinning and deep drawing into the aluminium alloy liner 4 at a speed of 30 to 50 mm/s.

The aluminium alloy liner of the large volume hydrogen storage cylinder provided by the present application has a hydrogen storage capacity of more than 800 liters (L).

According to the present application, the aluminium ingot is heated to 520-550° C. and hot stamped to form a cup-shaped rough blank, which is then turned on a lathe to an accurate size with surface defects removed; the cup-shaped rough blank consists of a barrel and a bottom of equal wall thickness, with a rounded corner R transition between the bottom and barrel. It is then annealed to remove machining stresses and soften the texture, and finally thinned and lengthened in one or more cold deep drawing passes to achieve the designed wall thickness and length of the aluminium alloy liner. The deep-drawing die consists of a terrace die and at least one thinning ring, and mineral oil is used for lubrication during the drawing process.

The method for stamping aluminum alloy liners of large-volume hydrogen storage cylinders provided by the present application specifically includes:

step 1, heating a certain amount of aluminum ingots to 530-550° C., and keeping temperature for 40-60 s;

step 2, quickly transferring the aluminum ingots into a stamping outer die, with transferring duration being controlled within 10 s;

step 3, fixing the stamping outer die, forming a cup-shaped rough blank by stamping an inner membrane;

step 4, processing an R corner between the barrel and the bottom of the cup-shaped rough blank by a lathe after the cup-shaped rough blank is cooled, while controlling an outer diameter and eliminating defects on an outer surface;

step 5, machining an inner hole of the cup-shaped rough blank by lathe, eliminating defects and reaching a designed inner diameter to form a designed wall thickness; or machining an inner hole of the cup-shaped rough blank by deep boring, eliminating defects and reaching a designed inner diameter to form a designed wall thickness;

step 6, carrying out high-temperature annealing on the cup-shaped rough blank at 350-370° C.;

the deep-drawing die includes one terrace die and at least one thinning ring;

step 7, coating mineral oil inside and outside the cup-shaped rough blank;

step 8, placing the cup-shaped rough blank on a center of the thinning die; and step 9, fixing the thinning die, and driving the terrace die to press the cup-shaped rough blank into the thinning die at a speed of 30-50 mm/s, where the gap between the terrace die and the thinning die is less than the wall thickness of the cup-shaped rough blank so as to achieve the thinning; the thinning rate is calculated as follows: thinning rate $\psi$=wall thickness after thinning $t_n$/wall thickness before thinning $t_{n-1}$. The thinning rate of one pass is controlled between 0.5 and 0.6, and in cases where the total thinning amount is large and multiple passes of thinning and deep drawing are available, the thinning rate of a first pass thinning is selected to be 0.5-0.6, that of an intermediate pass thinning is between 0.63 and 0.72, and that of a final pass thinning is above 0.75.

The stamping method is a processing method of preparing aluminum alloy liner of a hydrogen storage cylinder by heat stamping of an aluminum ingot, then turning, and finally cold drawing and forming with no need of strong spinning and thinning.

In conclusion, it should be noted that the above embodiments are only preferred embodiments of the present application to illustrate the technical schemes of the present application, not to limit them, and certainly not to limit the scope of the present application. Despite the detailed description of the present application with reference to the preceding embodiments, a person of ordinary skill in the art should understand that: it is still possible to modify the technical solutions recorded in the preceding embodiments, or to make equivalent substitutions for some or all of the technical features thereof; and these modifications or substitutions do not take the essence of the corresponding technical schemes out of the scope of the technical schemes of the embodiments of the present application; in other words, any insubstantial changes or embellishments made to the main idea and spirit of the present application, which still solve the same technical problem as the present application, shall be included in the scope of protection of the present application. In addition, the direct or indirect application of the technical schemes of the present application to other related fields of technology is equally covered by the protection scope of the present application.

What is claimed is:

1. A method for stamping aluminum alloy liners of hydrogen storage cylinders, comprising:

heating and stamping an aluminum ingot to form a cup-shaped rough blank;

turning the cup-shaped rough blank on a lathe to achieve a designed size and eliminate surface defects in the cup-shaped rough blank to yield a blank;

performing an annealing treatment on the blank to remove machining stresses and soften a microstructure of the blank; and cold deep drawing the blank to thin and lengthen the blank into an aluminum alloy liner;

wherein the cold deep drawing comprises a single pass or multiple passes;

when the cold deep drawing comprises the single pass, a thinning rate is controlled between 0.5 and 0.6;

when the cold deep drawing comprises the multiple passes, the thinning rate for a first pass of the multiple passes is controlled between 0.5 and 0.6, intermediate passes of the multiple passes are controlled between 0.63 and 0.72, and a final pass of the multiple passes exceeds 0.75.

2. The method for stamping aluminum alloy liners of hydrogen storage cylinders according to claim 1, wherein heating and stamping the aluminum ingot to form the cup-shaped rough blank comprises heating the aluminum ingot to 530-570° C., and holding for 40-60 seconds; transferring the aluminum ingot into a stamping outer die within 10 seconds; fixing the stamping outer die in position, and stamping the aluminum ingot with an inner membrane to form the cup-shaped rough blank.

3. The method for stamping aluminum alloy liners of hydrogen storage cylinders according to claim 1, wherein the cup-shaped rough blank comprises a barrel and a bottom, and a transition between the bottom and the barrel is formed with a radius fillet.

4. The method for stamping aluminum alloy liners of hydrogen storage cylinders according to claim 3, wherein the barrel and the bottom of the cup-shaped rough blank have a uniform wall thickness.

5. The method for stamping aluminum alloy liners of hydrogen storage cylinders according to claim 1, wherein the cup-shaped rough blank is turned to have a specified outer diameter, a specified inner diameter, and a specified wall thickness.

6. The method for stamping an aluminum alloy liner of hydrogen storage cylinder according to claim 1, wherein an annealing temperature while performing the annealing treatment ranges from 350° C. to 370° C.

7. The method for stamping an aluminum alloy liner of hydrogen storage cylinder according to claim 1, wherein placing the cup-shaped rough blank on a center of a thinning die, the cold deep drawing comprises plunging the blank into the thinning die at a speed of 30-70 mm/s to form the aluminum alloy liner through thin-forming deep drawing.

8. The method for stamping an aluminum alloy liner of hydrogen storage cylinder according to claim 1, wherein mineral oil is used for lubrication during the cold deep drawing.

* * * * *